United States Patent Office 3,647,691
Patented Mar. 7, 1972

3,647,691
MONO- AND BIS-NITROGEN-CONTAINING
COMPOUNDS
Billy D. Vineyard, St. Louis, Mo., assignor to Monsanto
Company, St. Louis, Mo.
No Drawing. Continuation-in-part of abandoned application Ser. No. 507,066, Nov. 9, 1965. This application Mar. 10, 1969, Ser. No. 805,897
Int. Cl. C10m 1/38, 1/36, 1/34
U.S. Cl. 252—51.5 A
6 Claims

ABSTRACT OF THE DISCLOSURE

Mono- and bis-nitrogen-containing compounds useful as ashless detergents in lubricating oil compositions. The mono-compounds are prepared by reacting a long-chain ketone or aldehyde, a divalent nitrogen-containing compound, and a carbonyl-containing compound. The bis-compounds are prepared by reacting a long-chain ketone or aldehyde, a divalent nitrogen-containing compound, and a dicarboxylic acid or a dialdehyde or diketone.

This application is a continuation-in-part of copending application Ser. No. 507,066 filed Nov. 9, 1965, now abandoned.

This invention relates to certain new nitrogen-containing compounds which are useful as detergents in lubricating oil compositions and to a new process for the formation of lubricating oil additives.

Under the conditions encountered in a large percentage of present-day automobile driving (i.e., the so-called stop-and-go driving), automobile engines do not attain their most desirable and efficient operation temperatures. As a result, large quantities of oil-insoluble oxidation products are formed which eventually find their way into the crankcase by flowing past the piston rings. Since most of these products are oil insoluble, they tend to deposit on the internal parts of the engine, resulting in further inefficient engine operation.

In present-day practice, deposition of the oxidation products is minimized by incorporating into lubricating oils detergents which keep the oxidation products dispersed. Generally, the detergents in use today are metal-containing compounds. The use of metal-containing detergents, however, has not been totally satisfactory since such detergents form ash deposits in the combustion chambers of engines, fouling the spark plugs and creating other problems such as preignition.

It has now been found that the problems associated with the use of metal-containing detergents can be avoided by the use of certain new non-metallic compounds which are effective ashless detergents or dispersants and which are mono compounds having the structure $$R-C=N-R_1-Y-R_2$$
$$\phantom{R-C=N-}|$$
$$\phantom{R-C=N-}R_3$$

and bis compounds having the structure

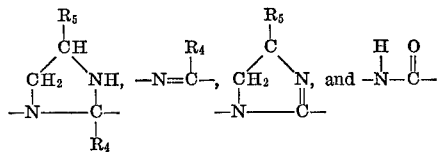

wherein R can be a polymeric monovalent radical derived from a lower mono-olefin having from 2 to 5 carbon atoms said radical having a molecular weight of from about 500 to about 3000, preferably from about 700 to about 2000 molecular weight; $R_1$ is alkylene, phenylene, alkyl phenylene, haloalkylene, halophenylene, a divalent organic group consisting of carbon, nitrogen and hydrogen and containing from 4 to 16 carbon atoms and from 1 to 6 nitrogen atoms for example a

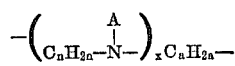

group where A is hydrogen, $a$ an alkyl $C_1$-$C_6$ group, $n$ and $a$ are integers having a value of from 2 to 4 there being at least 2 carbon atoms in the chain and $x$ has a value of from 1 to 6, said organic group optionally containing from about 1 to 4 piperazino or phenylene radicals or a substituted divalent organic group, said substituted organic group containing from 4 to 16 carbon atoms and from 1 to 6 nitrogen atoms, wherein the substituents are selected from the group consisting of alkyl, aminoalkyl, alkylaminoalkyl, dialkylaminoalkyl, N-piperazinoalkyl, alkyl piperazino alkyl and a monovalent group containing 4 to 8 carbon atoms and from 1 to 3 nitrogen atoms, said monovalent group optionally containing from about 2 to 4 piperazino radicals; $R_2$ can be hydrogen, alkyl, cycloalkyl, alkenyl, aryl, or a carbon-containing heterocyclic radical having from 4 to 10 atoms in the heterocyclic ring in which the hetero atoms are selected from the group consisting of nitrogen, oxygen and sulfur; $R_3$ can be hydrogen or alkyl; Y can be a divalent radical, said divalent radical being selected from the group consisting of

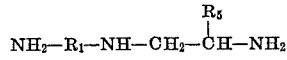

wherein $R_4$ and $R_5$ can be hydrogen or alkyl and can be identical or different and Z can be alkylene or alkenylene, provided that when Y is

$R_2$ is limited to a radical selected from the group consisting of hydrogen, alkyl, alkenyl or haloalkyl.

The new mono compounds of this invention can be prepared by reacting (a) a long-chain ketone or aldehyde represented by the structure

and
(b) a diamine compound, that is
(i) a compound represented by the structure $$NH_2-R_6-NH_2$$

wherein $R_6$ is selected from the group consisting of alkylene, phenylene, alkyl phenylene or halophenylene or
(ii) a compound represented by the structure

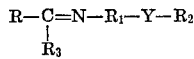

wherein $R_1$ and $R_5$ have their aforedescribed significance
and
(c) a carbonyl-containing compound, that is
(i) a monocarboxylic acid represented by the structure

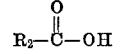

or the anhydride thereof or
(ii) an aldehyde or ketone represented by the structure

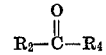

wherein R, $R_2$, $R_3$ and $R_4$ have their aforedescribed significance.

Normally the mole ratio of (a):(b):(c) will be about 1:1:1; however, reactant (a) can be used in excess of up to about 20% to insure complete reaction, there being no deleterious effect on detergent activity due to the remaining unreacted reactant (a). When an acid anhydride (c) is used in place of the monocarboxylic acid, the mole ratio of (a):(b):(c) will be about 1:1:0.5. The reaction can be carried out by mixing simultaneously (a), (b) and (c) or by adding (c) to a mixture of (a) and (b) or by adding (a) to a mixture of (b) and (c), there being no critical order of addition or reactants. A hydrocarbon solvent, such as short-chain aliphatic, and aromatic solvents, such as toluene and xylene, can be used as diluents to facilitate the removal of reaction by-products, such as water. A mineral oil or distillate oil can also be used as a diluent, alone or together with a hydrocarbon solvent. The temperature of reaction can be from about 50° C. to about 250° C., preferably from about 70° C. to 160° C. with reaction times of about 2 hours to about 8 hours. This reaction can be carried out at atmospheric pressure, or a reduced pressure can be used.

It is also contemplated within the scope of this invention that when the mono compounds of this invention contain additional unreacted primary and secondary amino groups, that is, $R_1$ contains primary or secondary amino groups or both, that these mono compounds can in turn be further reacted with (a) or (c) or mixtures thereof wherein (a) and (c) have their aforedescribed significance to produce compounds and mixtures of compounds which themselves have utility as lubricating oil additives. While the exact structure of the new compounds and mixtures of compound cannot be readily ascertained, they can be described by a process for their preparation. The process is carried out by mixing (a), (b)(ii) and (c) in indifferent order or simultaneously wherein the mole ratio of the sum of (a) and (c) to (b)(ii) is from about 2.1:1 to about 4:1, preferably from about 2.1:1 to about 3:1 providing that there is at least one mole of (a) and one mole of (c) and heating the mixture from about one hour to about 36 hours, preferably from about 2 to about 16 hours at a temperature of from about 50° C. to about 300° C., preferably from about 70° C. to about 200° C. A hydrocarbon solvent, such as short-chain aliphatic, and aromatic solvents, such as toluene and xylene, can be used as diluents to facilitate the removal of reaction by-products, such as water. A mineral oil or distillate oil can also be used as a diluent, alone or together with a hydrocarbon solvent. This reaction can be carried out at atmospheric pressure, or a reduced pressure can be used.

The bis compounds of this invention can be prepared by reacting (a) and (b), as described above, and (c) a compound, that is
  (i) a dicarboxylic acid represented by the structure

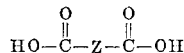

or the anhydride thereof or
  (ii) a dialdehyde or diketone represented by the structure

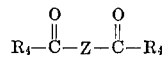

wherein R, $R_3$, $R_4$ and Z have their aforedescribed significance.

Normally the mole ratio of (a):(b):(c) will be about 2:2:1; however, reactant (a) can be added in excess of up to about 20% to insure complete reaction, there being no deleterious effect on detergent activity due to the remaining unreacted reactant (a). The reaction can be carried out by mixing simultaneously (a), (b) and (c) or by adding (c) to a mixture of (a) and (b) or by adding (a) to a mixture of (b) and (c), there being no critical order of addition of reactants. A hydrocarbon solvent, such as a short-chain aliphatic, or aromatic solvents, such as toluene and xylene, can be used as diluents to facilitate the removal of reaction by-products, such as water. A mineral oil or distillate oil can also be used as a diluent, alone or together with a hydrocarbon solvent. The temperature of reaction can be from about 50° C. to 250° C., preferably from about 70° C. to 160° C. This reaction can be carried out at atmospheric pressure for about 2 hours to about 8 hours, or at reduced pressure can be used.

The intermediate long-chain ketone (a),

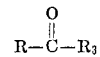

wherein R and $R_3$ have their aforedescribed significance, can be prepared by reacting an olefin polymer or olefin copolymer or mixtures thereof, hereinafter sometimes referred to as a polyolefin, from about 500 to 3000 molecular weight, preferably from 700 to 2000 molecular weight, with ozone to form an ozonized polyolefin. Preferably, a polymer of a lower olefin, or copolymers of lower olefins, is used, for example, polymers of ethylene, propylene, butylene, isobutylene or mixtures thereof. Copolymers which are also useful are copolymers of lower olefins and diolefins, such as 1,3-butadiene and isoprene.

Prior to contacting the olefin polymer with ozone, a short-chain alcohol of from 1 to 12 carbon atoms, preferably from 1 to 8 carbon atoms is added to the polymer. The alcohol is usually present in a mole ratio to the olefin polymer of from about 1 to 40 moles of alcohol per mole of polymer, preferably from about 1 to 10 moles of alcohol per mole of polymer. A diluent may be utilized such as a lower hydrocarbon solvent, or a mineral oil or distillate oil can also be utilized singly or in conjunction with a short-chain aliphatic solvent. The ozone is contacted with the polymer-alcohol system at a rate of about 0.50 millimole per minute ozone per mole of polymer to about 10 millimoles per minute ozone per mole of polymer, preferably from about 1 millimole per minute ozone per mole of polymer to about 6 millimoles per minute ozone per mole of polymer. The reaction can be conducted at a temperature of from about $-50°$ C. to about $+50°$ C., preferably from about $-30°$ C. to about $+30°$ C. The time for reaction of the ozone with the polymer-alcohol reactant mixture is generally determined to be that time that is required to effect an ozone input approximately equal to the ozone output.

In the past ozonized polyolefins have been decomposed through the use of hydrogen over a rare metal catalyst. Also, zinc and glacial acetic acid have been employed to effect decomposition. The decomposition methods had to be employed when an aliphatic aldehyde or ketone was attempted to be prepared in good yields. However, the use of said methods are commercially undesirable due to their high cost and the subsequent difficulty in removing catalyst from the final product.

It has now been found that an ozonized polyolefin can be decomposed to form a long-chain ketone by a process which overcomes the problems associated with the prior art methods comprising contacting an ozonized polyolefin with steam for a period of from about 1 hour to about 8 hours, preferably from about 2 hours to about 4 hours. The ozonized polyolefin is maintained at a temperature of from about 95° C. to about 150° C., preferably from about 100° C. to about 140° C. The steam is generally contacted with the ozonized polyolefin at a rate of about 0.10 mole per minute steam to about 2.0 moles per minute steam per mole of ozonized polybutene, preferably from about 0.75 to about 1.25 moles per minute steam per mole of ozonized polybutene. The temperature of the steam is generally from about 90° C. to about 200° C., preferably from about 100° C. to about 150° C.

Typical examples of amines which can be used in preparing compounds of this invention are diethylenetriamine, di(methylethylene) triamine, triethylenetetramine, tri(methylethylene)tetramine, tri(ethylethylene)tetramine, tetraethylenepentamine, pentaethylenehexamine, ethylenediamine, hexamethylenediamine, o-phenylenediamine, m-phenylenediamine, p-phenylenediamine, alkyl-substituted o-, m- and p-phenylenediamine, dimethylaminomethylamine, dimethylaminoethylamine, dimethylaminopropylamine, dimethylaminobutylamine, dimethylaminoheptylamine, diethylaminomethylamine, diethylaminopropylamine, diethylaminoamylamine, dipropylaminopropylamine, methylpropylaminoamylamine, propylbutylaminoethylamine, dimethylenetrianiline, methylenedianiline and polyalkylmethyleneaniline, prepared from the reaction of an aldehyde with aniline in the presence of an acidic catalyst, such as acid treated siliceous clay. Thus, formaldehyde produces polymethyleneaniline when reacted with aniline.

Typical examples of mixtures of polyamines are those sold under the names of Polyamine M, Polyamine H and Polyamine D by Union Carbide Chemical Co. These polyamines are prepared most conveniently by the reaction of ethylene dichloride with ammonia. This process results in the production of somewhat complex mixtures of ethyleneamines, including cyclic condensation products such as piperazines and these mixtures find use in the process of this invention. On the other hand quite satisfactory products may be obtained also by the use of pure ethyleneamines as heretofore described. An especially useful ethyleneamine, for reasons of economy as well as effectiveness as a dispersant, is a mixture of polyethyleneamines prepared by the reaction of ethylene dichloride and ammonia, having a composition which corresponds to that of tetraethylenepentamine. These mixtures are available in the trade under the trade names "Polyamine H" and "Polyamine M." Polyamine M as the following properties: 34.1% nitrogen, 14.7% primary amine, average molecular weight of 212 and a distillation distribution at 5 mm. of Hg of 10% at 137° C., 50% at 200° C. and 80% at 217° C. Polyamine D has an average molecular weight of 233 and 31.5% nitrogen. The principal components of Polyamine D are believe to have the following structures:

NH$_2$—CH$_2$—CH$_2$—NH—CH$_2$—CH$_2$—NH—CH$_2$—CH$_2$—NH—CH$_2$—CH$_2$—NH—CH$_2$—CH$_2$—NH$_2$ 3,6,9,12-tetraaza-1,14-tetradecanediamine NH$_2$—CH$_2$—CH$_2$—NH—CH$_2$—CH$_2$—N—CH$_2$—CH$_2$—NH—CH$_2$—CH$_2$—NH$_2$
|
CH$_2$
|
CH$_2$
|
NH$_2$ 6-(a-aminoethyl)-3,6,9-triaza-1,11-undecanediamine NH$_2$—CH$_2$—CH$_2$—N—CH$_2$—CH$_2$—NH—CH$_2$—CH$_2$—NH—CH$_2$—CH$_2$—NH$_2$
|
CH$_2$
|
CH$_2$
|
NH$_2$ 3-(2-aminoethyl)-3,6,9-triaza-1,11-undecanediamine

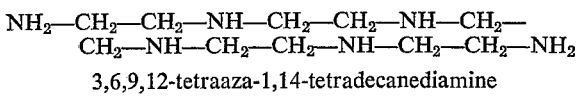

3,6-bis(2-aminoethyl)-3,6-diaza-1,8-octanediamine

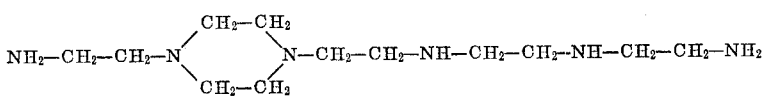

1,4-bis(3-aza-5-aminopentyl)piperazine

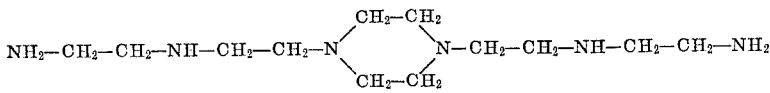

1-(2-aminoethyl)-4-(8-amino-3,5-diazooctyl)piperazine

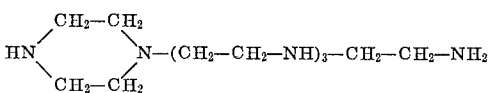

1-(11-amino-3,6,9-triazaundecyl)piperazine

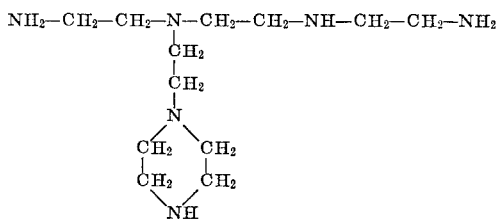

1-[8-amino-3-(2-aminoethyl)-3,6-diazaoctyl]piperazine

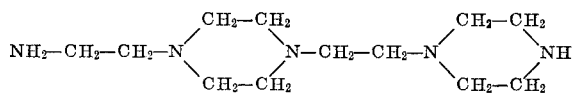

4-(2-aminoethyl)-1,1'-ethylenedipiperazine

These components are sold as a mixture, however, this invention contemplates that the individual compounds can themselves be utilized as an amine reactant. Polyalkylene imines are also suitable amines and can be prepared by the polymerization of compounds such as ethylene imine, 1,2-propylene imine, 1,2-butylene imine, 2,3-butylene imine, 2-methyl-1,2-propylene imine, isobutylene imine, trimethylene imine and hexamethylene imine by the use of known polymerization processes. A typical polymerization process is given in U.S. Pat. No. 3,200,088. Illustrative of the alkylene groups that R$_2$ represent are those having the formula —C$_b$H$_{2b}$— wherein $b$ is an integer having a value of from 2 to 18, the free valences being attached to different carbon atoms in the chain, e.g. ethylene, propylene, butylene, methylethylene, 1,2-dimethylbutylene, octadecylene, decylene etc. The alkylphenylene groups represented by R$_1$ can contain up to 12 carbon atoms e.g., tolylene, durylene, xylylene, mesitylene, 2,4,6 - triethyl-p-phenylene etc., the haloalkylene groups are for example, dichloroethylene, chloropropylene, trichlorobutylene, bromoethylene, etc. and the halophenylene are, the bromophenylenes, the chlorophenylenes, the fluorophenylenes, e.g. 2-chloro-p-phenylene, 2-bromo-p-phenylene 6-bromo-m-phenylene etc. Illustrative of the divalent organic radicals also included in $R_1$ are for example

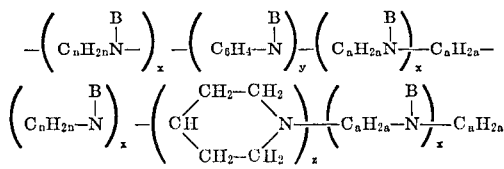

and

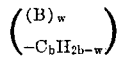

wherein A, $n$, $a$, $b$ and $x$ have the above-defined meaning $y$ and $z$ are integers of from 1 to 4 $w$ is an integer having a value of from 1 to 4, B is a member of the group consisting of alkyl, $C_{1-8}$ e.g. methyl, ethyl, propyl, butyl, octyl etc., aminoalkyl, e.g. aminoethyl, aminobutyl, aminooctyl etc., alkylaminoalkyl e.g. N-ethylaminoethyl, N-butylaminobutyl etc., dialkyl-aminoalkyl, e.g. N,N-diethylaminoethyl, N,N-dipropylaminopropyl etc., N-piperazinoalkyl, $C_5H_9N-C_dH_{2d}$ where $d$ is from 2 to 8 such— N-piperazinoethyl, N-piperazinobutyl etc. Also included in the group which $R_1$ represents is the residual divalent radical derived by the removal of the terminal primary amino groups of the amines and polyamines listed above, e.g. diethylene and triamine, polymethylene aniline, 3,6, 9,12-tetraaza-1,14 tetradecanediamine etc.

In the case of the monocarboxylic acids useful in preparing the mono compounds of this invention, the following are representative:

(a) ALIPHATIC MONOCARBOXYLIC ACIDS (i) Where $R_2$ is an alkyl or substituted-alkyl radical.— Formic acid, acetic acid, fluoroacetic acid, propionic acid, β-chloropropionic acid, butyric acid, isobutyric acid, nitroisobutyric acid, valeric acid, isovaleric acid, hexanoic acid, heptanoic acid, 2-ethylhexanoic acid, nonanoic acid, decanoic acid, dodecanoic acid, undecanoic acid, tetradecanoic acid, hexadecanoic acid, heptadecanoic acid, octadecanoic acid, eicosanoic acid, decosanic acid, docosanic acid, triacontanoic acid, and neotridecanoic acid.

(ii) Where $R_2$ is an alkenyl or substituted-alkenyl radical.—Butenic acid, pentenic acid, hexenic acid, tetracrylic acid, hypogeic acid, oleic acid, elaidic acid, linoleic acid, α-eleostearic acid, β-eleostearic acid, α-linoleic acid, acrylic acid, β-chloroacrylic acid, methacrylic acid, crotonic acid, isocrotonic acid, 3-butenoic acid, angelic acid, senecioic acid, hydrosorbic acid, sorbic acid and 4-tetradecenoic acid.

(b) ALICYCLIC MONOCARBOXYLIC ACIDS

Cyclopropanecarboxylic acid, cyclopentanecarboxylic acid, cyclohexanoic acid, hydrocaproic acid, chaulmoogric acid, naphthenic acid, 2,3,4,5-tetrahydrobenzoic acid and cyclodecanecarboxylic acid.

(c) AROMATIC MONOCARBOXYLIC ACIDS

Benzoic acid, 1-naphthoic acid, 2-naphthoic acid, o-toluic acid, m-toluic acid, p-toluic acid, o-chlorobenzoic acid, m-chlorobenzoic acid, p-chlorobenzoic acid, 2,3-dibromobenzoic acid, 3,4-dichlorobenzoic acid, o-nitrobenzoic acid, m-nitrobenzoic acid, p-nitrobenzoic acid, 2,3-dinitrobenzoic acid, salicylic acid, m-hydroxybenzoic acid, p-hydroxybenzoic acid, gallic acid, anisic acid, phenylacetic acid and β-phenylpropionic acid.

(d) HETEROCYCLIC MONOCARBOXYLIC ACIDS

Picolinic acid, nicotinic acid, furylacrylic acid, piperic acid, indoxylic acid, 3-indoleacetic acid, cinchoninic acid, furoic acid, thiophene-2-carboxylic acid, pyrrole-2-carboxylic acid, 9-acridancarboxylic acid, quinaldic acid, pyrazinoic acid and antipyric acid.

In the case of the dicarboxylic acids useful in preparing the bis compounds of this invention, the following are representative:

(a) ALIPHATIC DICARBOXYLIC ACIDS (i) Where Z is an alkylene radical.—Oxalic acid, malonic acid, succinic acid, glutaric acid, adipic acid, pimelic acid, suberic acid, azelaic acid, sebacic acid, brassylic acid and thapsic acid.

(ii) Where Z is an alkenylene radical.—Maleic acid, fumaric acid, glutaconic acid, citraconic acid, itaconic acid, ethidenemalonic acid, mesaconic acid, allylmalonic acid, allylsuccinic acid, teraconic acid, xeronic acid and cetylmalonic acid.

It is also contemplated herein the employ dimeric and trimeric polycarboxylic acids to produce the bis compounds of the present invention. When two like or unlike molecules of a polyethenoid monocarboxylic fatty acid condense to form a dicarboxylic acid, the product by definition is a dimer acid, or the carboxylic acid is said to be dimerized. In general, the dimer acids suitable for use in this invention are produced by the condensation of two like or unlike unsaturated aliphatic monocarboxylic acids having between about 16 and about 18 carbon atoms per molecules, examples of which comprise Δ9,11-hexadecadienoic acid
Δ9,12-heptadecadienoic acid
Δ8,12-octadecadienoic acid
Δ9,11-octadecadienoic acid
Δ9,12-octadecadienoic acid (linoleic acid)
Δ9,13-octadecadienoic acid
Δ9,11,13-octadecatrienoic acid
Δ9,12,15-octadecatrienoic acid (linolenic acid).

In the case of the carbonyl- and dicarbonyl-containing compounds useful in preparing the mono and bis compounds of this invention, the following are representative:

Mono-carbonyl containing:

(a) Aldehydes.—Formaldehyde, acetaldehyde, propionaldehyde, n-butyraldehyde, isobutyraldehyde, n-valeraldehyde, isovaleraldehyde, pivaldehyde, α-methylbutyraldehyde, caproaldehyde, tert.-butylacetaldehyde, heptaldehyde, pelagonaldehyde, nonanal, capraldehyde, lauraldehyde, tridecanal, myristaldehyde, fluraldehyde, 2-formylpyridene, 3-acetylindazol, 3-formylpyran, 3-formylpyrazole, pentadecanal, palmitaldehyde, heptodecanal, stearaldehyde, and the like; substituted aldehydes such as chloroacetaldehyde, chloral, butylchloral, trifluoroacetaldehyde, aldol, 2-hydroxypropionaldehyde and the like; and unsaturated aldehydes such as methacrolein, acrolein, crotanaldehyde, 3-butenal, 3- and 4-pentenal, 3-, 4- and 5-hexenal, 4-octenal, 2-ethyl-3-hexenal, 3-decenal and the like.

(b) Ketones.—Acetone, methyl ethyl ketone, methyl propyl ketone, methyl isopropyl ketone, methyl butyl ketone, methyl isobutyl ketone, methyl sec.-butyl ketone, methyl tert.-butyl ketone, methyl cyclobutyl ketone, n-methyl neopentyl ketone, methyl tert.-amyl ketone, methyl n-amyl ketone, methyl hexyl ketone, methyl cyclohexyl ketone, methyl n-heptyl ketone, methyl n-octyl ketone, methyl nonyl ketone, methyl decyl ketone, diethyl ketone, di-n-propyl ketone, diisopropyl ketone, ethyl isopropyl ketone, ethyl n-propyl ketone, ethyl tert.-butyl ketone, ethyl n-butyl ketone, tert.-butyl isopropyl ketone, n-propyl isopropyl ketone, n-propyl tert.-butyl ketone, diisobutyl ketone, 2-decanone, and the like; substituted ketones such as 3- and 4-methyl-2-hexanone, 3,4-dimethyl-2-pentanone, 3-ethyl-2-pentanone, and the like; unsaturated ketones such as allylacetone, 2- and 3-methyl-1-penten-4-one, 1-hepten-4-one, 3-methyl-1-hexen-5-one, 5-methyl-5-hexen-2-one, and the like.

Di-carbonyl containing:

(a) Aldehydes.—Glyoxal, malonaldehyde, succinaldehyde, glutaraldehyde, adipaldehyde, pimelaldehyde, suberaldehyde, azelaldehyde, sebacaldehyde, brassaldehyde, brassylaldehyde, and the like; unsaturated di-aldehydes such as malealdehyde, glutaconaldehyde, and the like.

(b) Ketones.—Diacetyl, acetylacetone, acetonylacetone, 2,3-hexanedione, 2,4-heptanedione, 3-methyl-2,4-hexanedione, 2,5-hexanedione, 2,3-octanedione, and the like.

Illustrative of the heterocyclic groups which $R_2$ represents are, for example pyridyl, indolyl, acridinyl, pyrryl, piperidinyl, guinolinyl, furyl, benzofuryl, pyronyl, xanthyl, indazyl, pyrimidyl, pyrazyl, cinnolinyl, quinozolyl, phenazinyl, pyrizolyl, parndroxm, 1,4 oxazenyl, benzoxozinyl, benzisoazolyl, benzisoxazolyl, oxazolyl, iso-oxazolyl, 1,2-benzopyronyl, naphthisdenyl, pyride(3-2-b)pyridinyl, corbazyl, pyridenyl, pyrozolyl groups etc.

The non-limiting examples that follow will permit a better appreciation of the preparation of the compounds of this invention.

Example 1

In a 1-liter 4-necked r.b. flask equipped with group glass stirrer and paddle, thermometer, gas inlet tube below surface and an off-gas exit tube were placed 200 grams (0.2 mole) polybutene, 985 molecular weight, 9.6 grams anhydrous methyl alcohol (0.3 mole) and 300 cc. of olefin-free hexane. The mixture was stirred until a homogeneous solution resulted at which point the temperature was taken to −75° C. with a Dry Ice-acetone bath. Ozone, at a flow rate of 0.855 millimole per minute (predetermined using hexane alone) was introduced. It was completely absorbed for 4 hours, after which time ozone was observed in the off-gas. The reaction vessel turned blue, indicating a saturated ozone solution. Ozone was continued to be introduced until the input rate equalled the output flow in the off-gas. Total reaction time required was 6.5 hours. The resulting ozonized polybutene in hexane was allowed to come to room temperature while flushing out the dissolved ozone with a stream of nitrogen.

Example 2

In a 1-liter 4-necked r.b. flask equipped with ground glass stirrer and paddle, thermometer (−50° C. to +100° C.), gas inlet tube below surface and off-gas exit tube were placed 200 grams of polybutene, 1350 molecular weight (0.15 mole), 250 cc. olefin-free hexane, and 9.6 grams (0.3 mole) anhydrous methyl alcohol. The temperature was maintained at 25° C. and ozone, at a predetermined rate of 0.8 millimole per minute was introduced. Ozone was completely absorbed for most of the reaction, and more slowly toward the end of the reaction. When the ozone concentration in the off-gas equalled the ozone input rate, the reaction was stopped (8 hours) and the dissolved excess ozone was purged from the ozonized polybutene with nitrogen.

Example 3

To a 500 ml. reaction flask was added 80 grams of ozonized polybutene (985 mole weight) which was topped of hexane and prepared as in Example 1. The flask was equipped with a gas inlet below the surface of the liquid and a reflux condenser mounted on a Dean-Stark trap. Steam was introduced at a temperature of 100° C. and the pot temperature was maintained at 105° C. for a period of two hours. The peroxide content before decomposition was 0.73 milliequivalent per gram and the polybutyl ketone had an acid number of 0.06 milliequivalent per gram and a peroxide number of 0.015 milliequivalent per gram after treatment with steam. The polybutyl ketone was confirmed by infrared analysis.

Additional examples of the preparation of ozonized polyolefins and the corresponding conversion to the polyalkyl ketone or aldehyde are given in Table I.

TABLE I

Ozonolysis of polyolefins

| Example number | Starting materials | | | | Reaction conditions | | | | | Ozonized product | |
|---|---|---|---|---|---|---|---|---|---|---|---|
| | Polybutene | | Methanol charge (ml.) | Hexane (ml.) | O₃ rate (mmole/min.) | Temp., °C. | Time (hrs.) | Solvent stripping | | Peroxide No. (meq./g.) | Acid No. (meq./g.) |
| | Mole wt. | Charge (g.) | | | | | | °C. | Mm. Hg | | |
| 4 | 985 | 248 | 20 | 375 | 0.8 | 0 | 6.5 | 80 | 30 | 0.55 | 0.17 |
| 5 | 1,356 | 247 | 20 | 315 | 0.8 | 0 | 11.0 | 80 | 30 | 0.44 | 0.18 |
| 6 | 339 | 250 | 45 | 250 | 0.8 | 0 | 23.0 | 60 | 30 | 1.93 | 0.80 |

Conversion of ozonized polyolefin to polyalkyl ketones

| | | Reaction conditions | | | | | | | | | | |
|---|---|---|---|---|---|---|---|---|---|---|---|---|
| | Stripped ozonized polybutene | Steaming | | Steam distillate | | | Drying | | Finished product | | | |
| | | Pot temp., °C. | Time (hrs.) | Water vol. (ml.) | Total acidity (meq.) | Oil vol. (ml.) | °C. | Mm. Hg | Mole wt. | Peroxide No. (meq./g.) | Acid No. (meq./g.) | Yield, g. |
| 7 | From Example 4 | 125-130 | 4 | 1,635 | 39.6 | | 150 | 30 | 1,007 | 0.009 | 0.07 | 2 |
| 8 | From Example 5 | 125-130 | 2 | 1,050 | 36.3 | | 150 | 30 | 1,385 | 0.007 | 0.07 | 2 |
| 9 | From Example 6 | 125-130 | 2 | 500 | | ¹ 55 | 120 | 30 | 368 | 0.049 | 0.47 | 1 |

¹ Oil distillate appears to be mainly low molecular weight ketones.

These results as are shown in Table I effectively demonstrate the efficiency of this process in converting an ozonized polyolefin to the corresponding ketone. The negligible peroxide number remaining in the decomposed polyolefin show the high yield obtained under mild conditions. A particular problem which is associated with polyolefins in their tendency to decompose into monomer units or multiples of monomer units under reaction conditions wherein catalysts are employed. A consequence of this decomposition is that they are no longer suitable as an intermediate for long-chain ashless detergents. It is evident from the above results, that the new process of this invention produces polyalkyl ketones without decompositions and degradation into lower molecular weight products.

Example 10

To a 4-necked reaction flask was charged 3.7 grams (0.0195 mole) of tetraethylenepentamine, 4.3 grams (0.0195 mole) of neotridecanoic acid and 75 ml. of xylene. To this mixture was then added 35 grams (0.0253 mole) of 1350 molecular weight polybutyl ketone, prepared as in Example 8. The reaction mixture was then heated to 155° C. for a period of four hours, after which 0.6 ml. of water was removed. The temperature was increased to 190° C. for three hours and an additional 0.3 ml. of water was removed. The xylene was topped from the reaction product. The compound had a nitrogen analysis of 0.84%.

Example 11

To a 4-necked reaction flask was added 2.8 grams (0.0195 mole) of triethylenetetramine, 1.4 grams (0.0195 mole) of butyraldehyde, and 60 mole of toluene. To this mixture was added polybutyl ketone, 1350 molecular weight, 35 grams (0.0253 mole). The resulting mixture was refluxed at 120° C. for 3½ hours as water was removed. The toluene was topped from the products and the final product had a nitrogen analysis of 1.60%. The 1-[6-polybutyl(1350)idene-3,6 - diazahexyl]-2-propylimidazolidine was confirmed by the decrease in primary amine relative to secondary amine present.

The following examples in Table II are additional preparations of the compounds of this invention. The compounds were prepared by adding (b) and (c) to a reaction flask followed by addition of (a). The temperature was maintained from about 120° C. to about 150° C. for a period of about 2 hours to about 4 hours. The term TETA means triethylenetetramine and TEPA means tetraethylenepentamine.

TABLE III

| Additive: | LDT, percent reduction |
|---|---|
| Product of Example 7 | 0 |
| Product of Example 8 | 13 |
| Product of Example 9 | 25 |
| Product of Example 10 | 89 |
| Product of Example 11 | 82 |
| Product of Example 12 | 91 |
| Product of Example 13 | 87 |
| Product of Example 14 | 90 |
| Product of Example 15 | 91 |
| Product of Example 16 | 94 |

The results shown in Table III effectively show the efficiency of the mono and bis compounds of this invention as detergents. The results obtained through the use of long-chain ketones, Examples 7, 8 and 9, point out that mere oil solubility of a polymer containing a functional group does not impart the detergency property to any practical degree.

TABLE II

| Ex. No. | Polyalkyl ketone (a) | Amine (b) | Third compound (c) | Mole ratio (a):(b):(c) | Percent nitrogen | Compound |
|---|---|---|---|---|---|---|
| 12 | Polybutyl ketone [1] | TEPA | Butyraldehyde | 1.2:1.0:1.0 | 2.01 | 1-[9-polybutyl (1350)idene-3,6,9-triazanonyl]-2-propyl imidazolidine. |
| 13 | do.[1] | TEPA | Undecanal | 1.2:1.0:1.0 | 1.80 | 2-n-decyl-1-[9-polybutyl(1350)-idene-3,6,9- triazanonyl imidazolidine. |
| 14 | do.[1] | TEPA | Butyraldehyde | 1.8:1.0:1.0 | 1.64 | Mixture of Schiff base compounds. |
| 15 | do.[1] | TEPA | do | 2:1.0:1.0 | 2.00 | Do. |
| 16 | do.[1] | TEPA | do | 1.6:1.0:1.0 | 2.70 | Do. |
| 17 | do.[1] | TEPA | Acetic acid | 1.0:1.0:1.0 | 3.40 | 2-methyl-1-[6-polybutyl (1,350) idene-3,6-diazahexyl]-2-imidazoline. |
| 18 | do.[2] | p-Phenylenediamine | Butyric acid | 1.0:1.0:1.0 | 2.20 | N-butyryl-N'-polybutyl (1,350) idene-p-phenylenediamine. |
| 19 | do.[1] | do | Butyraldehyde | 1.0:1.0:1.0 | 1.80 | N-butylidene-N'-polybutyl (1,350) idene-p-phenylene enediamine. |
| 20 | do.[1] | TEPA | Azelaic | 2.0:2.0:1.0 | 3.90 | Bis compound |
| 21 | do.[1] | TEPA | Azelaldehyde | 2.0:2.0:1.0 | 4.00 | Do. |

[1] 1,350 molecular weight. [2] 975 molecular weight.

Lubricating oils which can be used as the base oils to which the new compounds of this invention are added are not limited as far as detergent effects are concerned, and, accordingly, can be lubricating oils which are of a naphthenic base, paraffinic base, and other hydrocarbon bases, as well as lubricating oils derived from coal products and synthetic oils, such as alkylene polymers, alkylene oxide polymers, dicarboxylic acid esters, alkylated benzenes, silicate esters, silicon polymers, and the like, are suitable.

The mono and bis compounds of this invention can be used in lubricating oils in amounts of from about 0.05% to about 25% by weight. Additive concentrates of 60–95% are also contemplated. It has been found, however, that in finished formulations, for most applications, amounts of from about 0.25% to about 10% by weight are sufficient. In addition, the compounds of this invention can be used in fuel oils and in various light products, such as gasoline, wherein they also function as detergents or dispersants.

The effectiveness of the mono and bis compounds of this invention to impart low temperature detergent properties is illustrated by the results of a detergency test, referred to as the "Lacquer Deposition Test," which involves passing burned gasoline fumes through a sample of a formulation in a suitable container under controlled conditions after which the sample is aged in an oven. The amount of deposit is then determined by washing away the oil with hexane. A control formulation is run simultaneously. The amount of deposits present when the test detergent is used as compared to the amount of deposits present when no test detergent is used is reported as the percent reduction in deposit. This particular test is quite useful since it correlates quite well with the results obtained in the Lincoln MS sequence 5. Utilizing the above test, the results presented in Table III below were observed. In each test 2% by weight of a compound of this invention was employed.

Since the greater part of the commercial oils are subject to a large number of uses, it is generally necessary to employ more than one type of additive in a finished lubricant composition. Thus, although the reaction products prepared above are effective detergents, it is frequently necessary to use such products in combination with other types of additives, such as metal-containing detergents and/or dispersants, corrosion inhibitors, extreme pressure agents, oxidation inhibitors, viscosity index improvers, pour point depressors, antifoaming agents and the like.

While this invention has been described with reference to various specific examples and embodiments, it is understood that the invention is not limited thereto and that it can be variously practiced within the scope of the following claims.

What is claimed is:

1. A compound represented by the structure

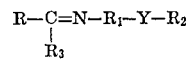

wherein R is a polymeric monovalent hydrocarbyl group derived from one or more lower olefins having 2 to 5 carbon atoms said group having a molecular weight of from about 500 to about 3000, $R_1$ is selected from the group consisting of phenylene, alkylphenylene and halophenylene, Y is a divalent radical selected from the group consisting of

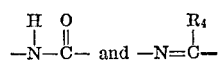

wherein $R_3$ and $R_4$ are selected from the group consisting of hydrogen and lower alkyl and $R_2$ is alkyl containing from 1 to 20 carbon atoms.

2. A compound of claim 1 wherein R is a polybutyl of an average molecular weight of from about 900 to about 2000.

3. A compound of claim 1 wherein $R_1$ is phenylene.

4. A compound represented by the structure

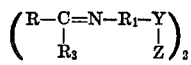

wherein R is a polymeric monovalent hydrocarbyl radical derived from 1 or more lower olefins containing from 2 to 5 carbon atoms said polymer having a molecular weight of from about 500 to about 3000; $R_1$ is selected from the group consisting of phenylene, alkylphenylene and halophenylene; Y is a divalent radical selected from the group consisting of

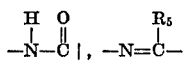

wherein $R_3$ and $R_4$ are selected from the group consisting of hydrogen and lower alkyl and Z is selected from the group consisting of alkylene and alkenylene, said group containing from 1 to 20 carbon atoms.

5. A compound of claim 4 wherein R is polybutyl of an average molecular weight of from about 900 to about 2000.

6. A compound of claim 4 wherein $R_1$ is phenylene.

References Cited

UNITED STATES PATENTS

| | | | |
|---|---|---|---|
| 3,087,936 | 4/1963 | Le Suer | 252—51.5 X |
| 3,219,666 | 11/1965 | Norman et al. | 252—51.5 X |
| 3,347,645 | 10/1967 | Pietsch et al. | 252—51.5 X |
| 3,390,086 | 6/1968 | Offalloran | 252—47.5 |
| 3,455,832 | 7/1969 | Davis | 252—51.5 |
| 3,458,530 | 7/1969 | Siegel et al. | 252—51.5 X |
| 3,527,804 | 9/1970 | Cyba | 252—51.5 X |

DANIEL E. WYMAN, Primary Examiner

W. H. CANNON, Assistant Examiner

U.S. Cl. X.R.

252—51.5 R, 47, 47.5, 50; 260—404.5, 562, 566 R, 566 D